(12) United States Patent
Cunningham

(10) Patent No.: US 6,386,820 B1
(45) Date of Patent: May 14, 2002

(54) HOIST DEVICE MOUNTABLE TO A PLOW MOUNT

(76) Inventor: Michael W. Cunningham, 1119 Hickory Hill Rd., Thomaston, CT (US) 06787

( * ) Notice: Subject to any disclaimer, the term of this patent is extended or adjusted under 35 U.S.C. 154(b) by 5 days.

(21) Appl. No.: 09/636,616

(22) Filed: Aug. 11, 2000

(51) Int. Cl.$^7$ .................................................. B60P 1/54
(52) U.S. Cl. ........................ 414/550; 414/462; 414/546
(58) Field of Search ................................. 212/180, 261; 414/680, 546, 462, 550, 543

(56) References Cited

U.S. PATENT DOCUMENTS

| | | | |
|---|---|---|---|
| 3,332,562 A | * 7/1967 | Kokott | 414/563 |
| 3,923,170 A | * 12/1975 | Marquis | 414/563 |
| 4,226,331 A | * 10/1980 | Dumond | 212/261 X |
| 4,406,574 A | * 9/1983 | Riley | 414/543 |
| 5,064,078 A | 11/1991 | Van Staveren | |
| 5,211,526 A | 5/1993 | Robinette | |
| 5,445,487 A | 8/1995 | Koscinski, Jr. | |
| 5,520,498 A | 5/1996 | Dibartolomeo | |
| 5,651,653 A | 7/1997 | Bablo | |
| 5,752,799 A | 5/1998 | Carey et al. | |
| 5,833,424 A | * 11/1998 | Bales | 414/24.5 |
| 5,993,137 A | * 11/1999 | Harr | 414/550 |

\* cited by examiner

Primary Examiner—Steven A. Bratlie

(57) ABSTRACT

A hoist device mountable to a plow mount includes a connecting mount. The connecting mount is adapted for removably coupling to a top portion of the plow mount. A hoist mount is removably coupled to the connecting mount and includes a first rod that is removably coupled to the connecting mount. A second rod is elongate and has a first end and a second end. The first end of the second rod is integrally coupled to the first rod in a generally perpendicular orientation. A third rod is elongate and has a first end and a second end. The third rod is pivotally coupled to the second end of the second rod so that the first end of the third rod is positioned generally adjacent to the second end of the second rod. The second end of the third rod is selectively urged in a vertical motion.

16 Claims, 3 Drawing Sheets

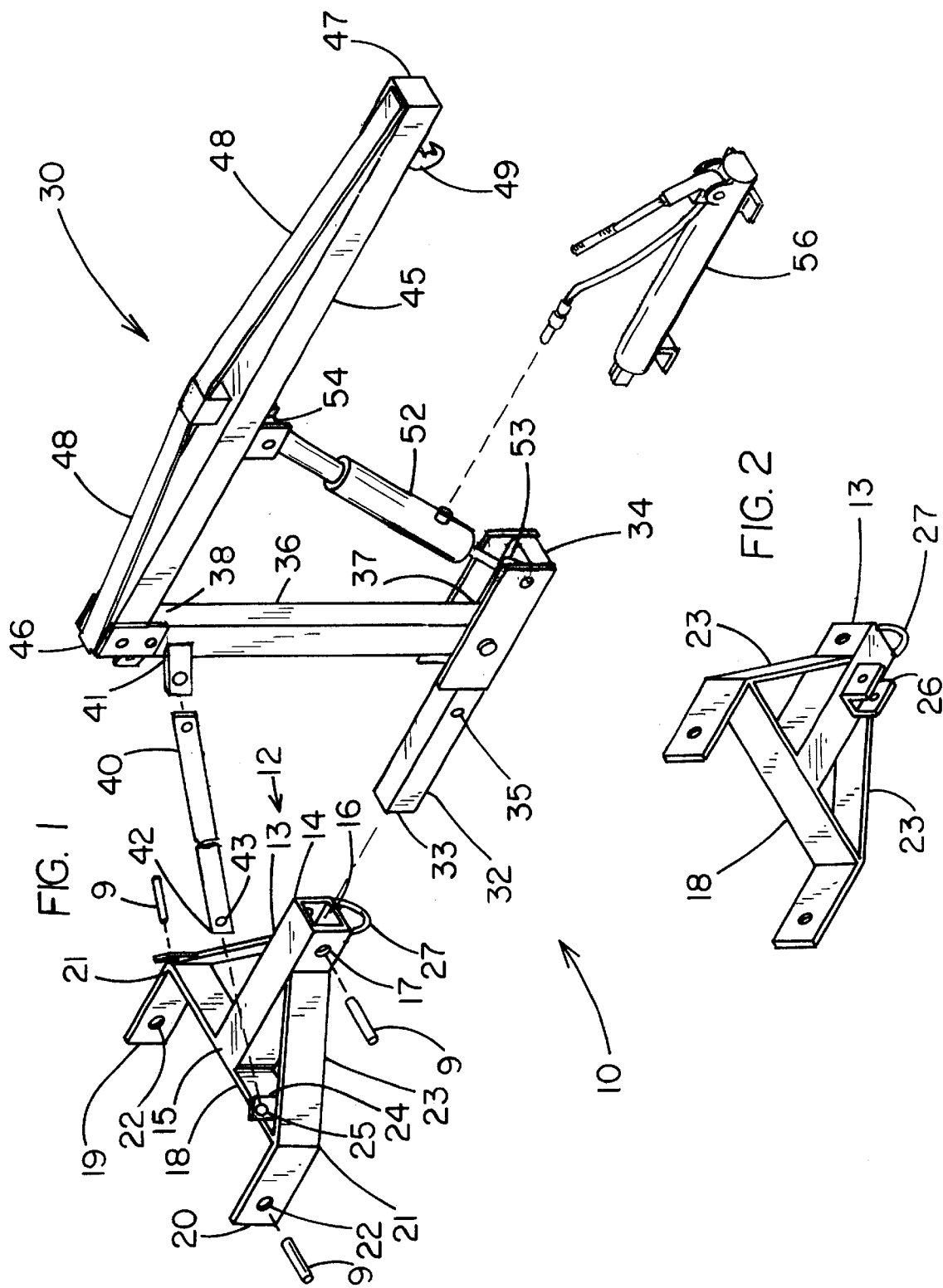

HOIST DEVICE MOUNTABLE TO A PLOW MOUNT

BACKGROUND OF THE INVENTION

1. Field of the Invention

The present invention relates to hoist devices and more particularly pertains to a new hoist device mountable to a plow mount for mounting to a plow mount, lifting a load and holding the load so that the vehicle can transport the load.

2. Description of the Prior Art

The use of hoist devices is known in the prior art. More specifically, hoist devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,520,498; 5,651,653; 5,211,526; 5,752,799; 5,064,078; and 5,445,487.

While these devices fulfill their respective, particular objectives and requirements, the aforementioned patents do not disclose a new hoist device mountable to a plow mount. The inventive device includes a connecting mount. The connecting mount is adapted for removably coupling to the top portion of a plow mount. A hoist mount is removably coupled to the connecting mount. The hoist mount includes a first rod. The first rod is removably coupled to the connecting mount. A second rod is elongate and has a first end and a second end. The first end of the second rod is integrally coupled to the first rod in a generally perpendicular orientation. A third rod is elongate and has a first end and a second end. The third rod is pivotally coupled to the second end of the second rod so that the first end of the third rod is positioned generally adjacent to the second end of the second rod. An urging means selectively urges the second end of the third rod in a vertical motion.

In these respects, the hoist device mountable to a plow mount according to the present invention substantially departs from the conventional concepts and designs of the prior art, and in so doing provides an apparatus primarily developed for the purpose of mounting to a plow mount, lifting a load and holding the load so that the vehicle can transport the load.

SUMMARY OF THE INVENTION

The general purpose of the present invention, which will be described subsequently in greater detail, is to provide a new hoist device mountable to a plow mount apparatus and method which has many of the advantages of the hoist devices mentioned heretofore and many novel features that result in a new hoist device mountable to a plow mount which is not anticipated, rendered obvious, suggested, or even implied by any of the prior art hoist devices, either alone or in any combination thereof.

To attain this, the present invention generally comprises a connecting mount. The connecting mount is adapted for removably coupling to the top portion of a plow mount. A hoist mount is removably coupled to the connecting mount. The hoist mount includes a first rod. The first rod is removably coupled to the connecting mount. A second rod is elongate and has a first end and a second end. The first end of the second rod is integrally coupled to the first rod in a generally perpendicular orientation. A third rod is elongate and has a first end and a second end. The third rod is pivotally coupled to the second end of the second rod so that the first end of the third rod is positioned generally adjacent to the second end of the second rod. An urging means selectively urges the second end of the third rod in a vertical motion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new hoist device mountable to a plow mount apparatus and method which has many of the advantages of the hoist devices mentioned heretofore and many novel features that result in a new hoist device mountable to a plow mount which is not anticipated, rendered obvious, suggested, or even implied by any of the prior art hoist devices, either alone or in any combination thereof.

It is another object of the present invention to provide a new hoist device mountable to a plow mount which may be easily and efficiently manufactured and marketed.

It is a further object of the present invention to provide a new hoist device mountable to a plow mount which is of a durable and reliable construction.

An even further object of the present invention is to provide a new hoist device mountable to a plow mount which is susceptible of a low cost of manufacture with regard to both materials and labor, and which accordingly is then susceptible of low prices of sale to the consuming public, thereby making such hoist device mountable to a plow mount economically available to the buying public.

Still yet another object of the present invention is to provide a new hoist device mountable to a plow mount which provides in the apparatuses and methods of the prior art some of the advantages thereof, while simultaneously overcoming some of the disadvantages normally associated therewith.

Still another object of the present invention is to provide a new hoist device mountable to a plow mount for mounting to a plow mount, lifting a load and holding the load so that the vehicle can transport the load.

Yet another object of the present invention is to provide a new hoist device mountable to a plow mount which includes a connecting mount. The connecting mount is adapted for removably coupling to the top portion of a plow mount. A hoist mount is removably coupled to the connecting mount.

The hoist mount includes a first rod. The first rod is removably coupled to the connecting mount. A second rod is elongate and has a first end and a second end. The first end of the second rod is integrally coupled to the first rod in a generally perpendicular orientation. A third rod is elongate and has a first end and a second end. The third rod is pivotally coupled to the second end of the second rod so that the first end of the third rod is positioned generally adjacent to the second end of the second rod. An urging means selectively urges the second end of the third rod in a vertical motion.

Still yet another object of the present invention is to provide a new hoist device mountable to a plow mount that is retrofittable to existing plow mounts designed for holding conventional plows.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new hoist device mountable to a plow mount according to the present invention.

FIG. 2 is a schematic bottom perspective view of the connecting mount of the present invention.

DESCRIPTION OF THE PREFERRED EMBODIMENT

Figure 3:
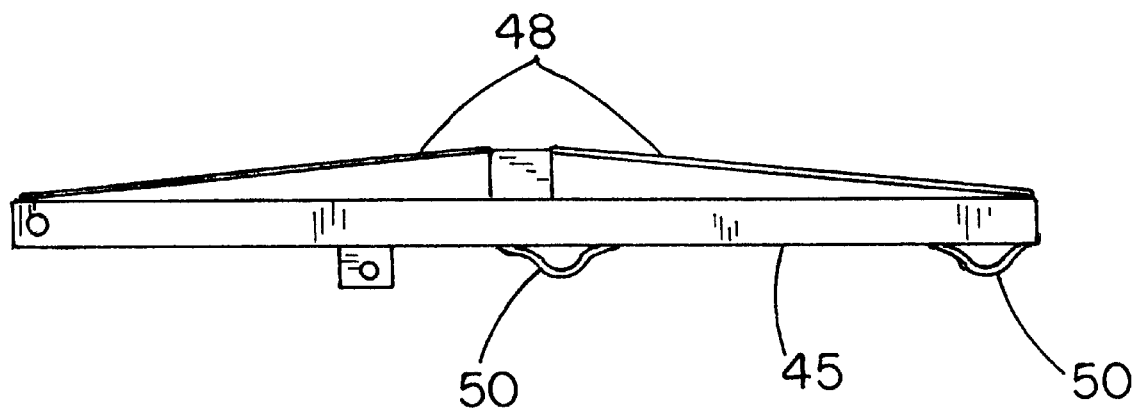
FIG. 3 is a schematic side view of the third rod of the present invention.
Figure 4:
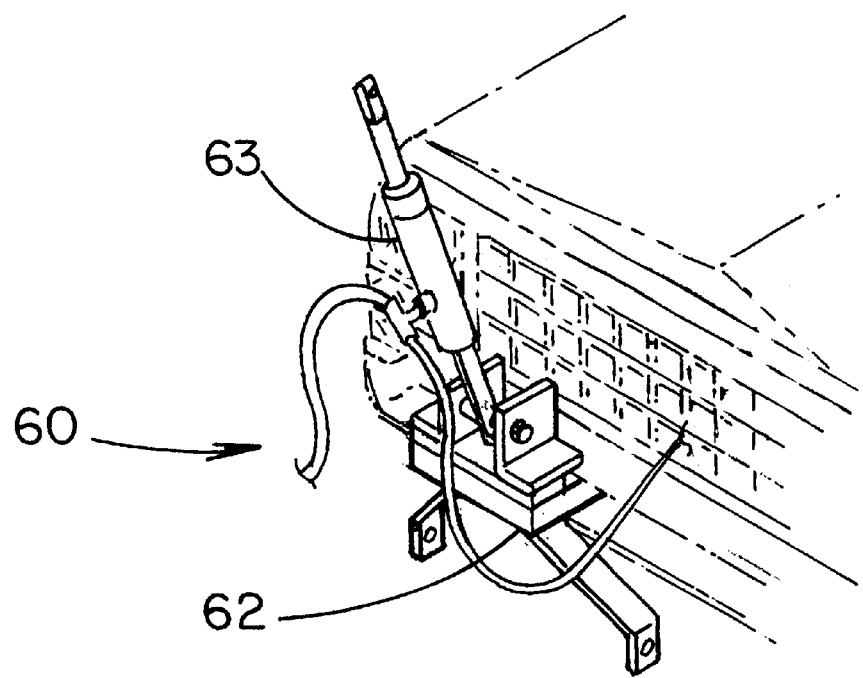
FIG. 4 is a schematic perspective view of the bracing member of the present invention.

With reference now to the drawings, and in particular to FIGS. 1 through 5 thereof, a new hoist device mountable to a plow mount embodying the principles and concepts of the present invention and generally designated by the reference numeral 10 will be described.

As best illustrated in FIGS. 1 through 5, the hoist device mountable to a plow mount 2 generally comprises an apparatus 10 that is removably mountable to a plow mount 2. The plow mount 2 is a conventional plow mount 2 used on trucks and has a bottom portion 4 coupled to a vehicle 5 and a receiving arm 6 extending upwardly from the bottom portion. The receiving arm 6 has a pair of spaced receiving members 7 thereon for receiving the apparatus. The receiving members have openings extending 8 therethrough.

The apparatus 10 includes a connecting mount 12. The connecting mount 12 includes a first bar 13. The first bar 13 has a first end 14 and a second end 15. The first end 14 has a well 16 extending therein. The first bar 13 has a pair of opposed openings 17 extending into the first bar 13 and into the well 16. The openings 17 are positioned generally adjacent to the first end 14 of the first bar 13.

A second bar 18 is elongate and has a first 19 and second end 20. The second bar 18 is integrally attached to the second end 15 of the first bar 13 such that the first 13 and second 18 bars generally have a T-shape. The second bar 18 has a pair of bends 21 therein. Each of the bends 21 is generally positioned between one of the ends 19, 20 of the second bar 18 and the first bar 13 such that the ends 19, 20 of the second bar 18 extend in an opposite direction of the first bar 12. The second bar 18 has a pair of apertures 22 therein. Each of the apertures 22 is generally located adjacent to one of the ends 19, 20 of the second bar 18. The ends 19, 20 of the second bar 18 are each removably coupled to one of the receiving members 7 of the plow mount 2 by insertion of a pin 9 or pole through the apertures 22 and openings 8 in the receiving members 7.

Each of a pair of reinforcing bars 23 is integrally coupled to and extends between one of the bends 21 in the second bar 18 and the first bar 13.

Each of a pair of tabs 24 is integrally coupled to and extends upwardly from one of the reinforcing bars 23. Each of the tabs 24 is positioned generally adjacent to one of the bends 19. Each of the tabs 24 has a hole 25 therethrough.

A bracket 26 is integrally coupled to a bottom side of the first bar.

A loop member 27 is integrally coupled to the bottom side of the first bar 13 and positioned generally adjacent to the first end 14 of the first bar 13.

A hoist mount 30 is removably coupled to the connecting mount 12. The hoist mount 30 includes a first rod 32. The first rod 32 is elongate and has a first 33 and second 34 end. The first end 33 of the first rod 32 is extendable into the well 16. The first rod 32 has a bore 35 extending therethrough. The bore 35 is alignable with the opposed openings 17 in the first bar 13. A pin 9 is extendable through the opposed openings 17 and the bore 35 to removably secure the first bar 13 to the first rod 32.

A second rod 36 is elongate and has a first end 37 and a second end 38. The first end 37 of the second rod 36 is integrally coupled to the first rod 32 in a generally perpendicular orientation. The second rod 36 is positioned generally between the first 33 and second 34 ends of the first rod 32. The second rod 36 is orientated generally perpendicular to the bore 35 extending through the first rod 32.

Each of a pair of reinforcing members 40 is elongate and has a first 41 and second 42 end. The first ends 41 of the reinforcing members 40 are each securably attached to the second rod 36 and positioned generally adjacent to the second end 38 of the second rod 36. Each of the reinforcing members 40 has an aperture 43 therein positioned generally adjacent to the second ends 42 of the reinforcing members 40. Each of a pair of pins 9 is extendable through one of the apertures 43 in the reinforcing member and through one of the holes 25 in the tabs 24 to removably attach each of the reinforcing members 40 to one of the tabs 24.

A third rod 45 is elongate and has a first end 46 and a second end 47. The third rod 45 is pivotally coupled to the second end 38 of the second rod 36. The first end 46 of the third rod 45 is positioned generally adjacent to the second end 38 of the second rod 36. A pair of elongate members 48 are coupled to the third rod 45 and form a triangle with the third rod 45 to offer strengthening support to prevent bending of the third rod 45.

A hook member 49 is securely attached to a bottom side of the third rod 45. The hook member 49 is located generally adjacent to the second end 47 of the third rod 45. The loop members 50 may also be positioned on the third rod 45.

An urging means 52 selectively urges, or lifts, the second end 47 of the third rod 45 in a vertical motion. The urging means 52 comprises a pump. The pump has a first end 53 and a second end 54. The second end 54 is extendable away from the first end 53. The first end 53 of the pump is pivotally coupled to the first rod 32 and positioned between the second rod 36 and the second end 34 of the first rod 32. The second end 54 of the pump is pivotally coupled to the third rod 45 and positioned between the second rod 36 and the second end 47 of the third rod 45. The urging means 52 preferably comprises a pneumatic pump which may be actuated using a standard hand or foot pump 56.

Figure 5:
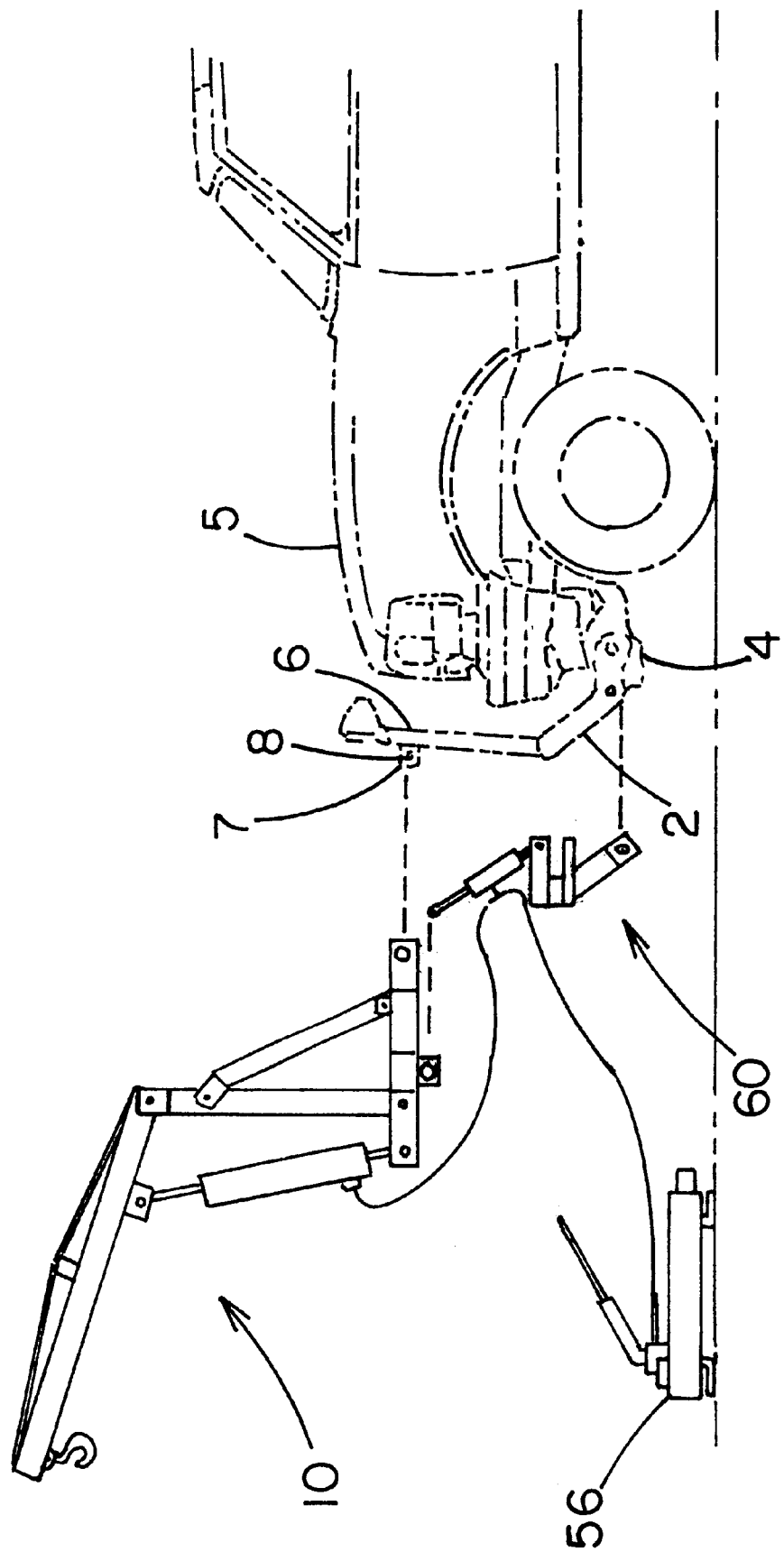
FIG. 5 is a schematic side view of the present invention.

A bracing member 60 braces the connecting mount 12 in relation to the bottom portion 4 of the plow mount 2. The bracing member 60 comprises a coupling means 62 for removably coupling to the bottom portion 4 of the plow mount 2. A biasing means 63 biases the connecting mount 12 away from the coupling means 62. The biasing means 63 extends between and is pivotally coupled to the coupling means 62 and the bracket 26 on the connecting mount 12. The biasing means 63 preferably comprises a pump, either hydraulic or pneumatic. The biasing means 63 may be actuated in conjunction with the urging means 52 as shown in FIG. 5.

In use, the apparatus 10 is mounted onto the plow mount 2. The plow mount 2 is used as a conventional plow mount and may be used to lift and lower the third rod 45 with respect to the ground. The urging means 52 allows greater upward mobility of the third arm 45 which lifts the second end 47 of the third rod 45 away from the ground in a vertical motion and with respect to the first rod 32. The hook member 49 is used to coupled to a chain or a portion of an item which is to be lifted. The user may pick up and object and then place it to a desired location by driving the vehicle 5 to that location. Optionally, the bracing member 60 may be used to prevent the receiving arms 6 from bending when the third arm 45 lifts a larger load.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible hoisting apparatus, said apparatus being removably mountable to a plow mount, the plow mount having a bottom portion coupled to a vehicle and a receiving arm extending upwardly from the bottom portion, the receiving arm having a pair of spaced receiving members thereon for receiving the apparatus, said apparatus comprising:
    a connecting mount being adapted for removably coupling to a top portion of said plow mount such that the plow mount may be used to selectively raise and lower the connecting mount with respect to a ground surface;
    a hoist mount being removably coupled to said connecting mount, said hoist mount comprising;
        a first rod being removably couplable to said connecting mount;
        a second rod being elongate and having a first end and a second end, said first end of said second rod being integrally coupled to said first rod in a generally perpendicular orientation;
        a third rod and having a first end and a second end, said third rod being pivotally coupled to said second end of said second rod, said first end of the third rod being positioned generally adjacent to said second end of said second rod; and
        an urging means for selectively urging said second end of said third rod in a vertical motion.

2. The collapsible hoisting apparatus as in claim 1, wherein said connecting mount comprises:
    a first bar having a first end and a second end, said first end having a well extending therein;
    a second bar being elongate and having a first and second end, said second bar being integrally attached to said second end of said first bar such that said first and second bars generally have a T-shape, said second bar having a pair of bends therein, each of said bends being generally positioned between one of the ends of said second bar and said first bar such that said ends of said second bar extend in an opposite direction of said first bar, said second bar having a pair of apertures therein, each of said apertures being generally located adjacent to one of the ends of said second bar, wherein each of said ends of said second bar are removably coupled to one of said receiving members of said plow mount; and
    wherein said first rod is extendable into said well.

3. The collapsible hoisting apparatus as in claim 2, wherein said connecting mount further includes a pair of reinforcing bars, each of said reinforcing bars being integrally coupled to and extending between one of said bends in said second bar and said first bar.

4. The collapsible hoisting apparatus as in claim 3, wherein said apparatus further includes:
    a pair of tabs, each of said tabs being integrally coupled to and extending upwardly from one of said reinforcing bars, each of said tabs being positioned generally adjacent to one of said bends, each of said tabs having a hole therethrough; and
    a pair of reinforcing members, each of said reinforcing members being elongate and having a first and second end, said first ends of said reinforcing members being securably attached to said second rod and positioned generally adjacent to said second end of said second rod, each of said second ends being removably attachable to one of said tabs.

5. The collapsible hoisting apparatus as in claim 2, further comprising:
    a bracket being integrally coupled to a bottom side of said first bar; and
    a bracing member for bracing said connecting mount in relation to said bottom portion of said plow mount, said bracing member extending between said bottom portion and said bracket on said first bar.

6. The collapsible hoisting apparatus as in claim 5, wherein said bracing member comprises:
    a coupling means for removably coupling to the bottom portion of the plow mount; and a biasing means for biasing said connecting mount away from said coupling means, said biasing means extending between and being pivotally coupled to said coupling means and said bracket on said connecting mount, said biasing means comprising a pump.

7. The collapsible hoisting apparatus as in claim 1, wherein said hoist mount further includes a hook member, said hook member being securely attached to a bottom side of said third rod, said hook member being located generally adjacent to said second end of said third rod.

8. The collapsible hoisting apparatus as in claim 1, wherein said urging means comprises a pump having a first end and a second end extendable away from said first end, said first end of said pump being pivotally coupled to said first rod and positioned between said second rod and said second end of said first rod, said second end of said pump being pivotally coupled to said third rod and positioned between said second rod and said second end of said third rod, said urging means comprising a pneumatic pump.

9. A collapsible hoisting apparatus, said apparatus being removably mountable to a plow mount, the plow mount having a bottom portion coupled to a vehicle and a receiving arm extending upwardly from the bottom portion, the receiving arm having a pair of spaced receiving members thereon for receiving the apparatus, said apparatus comprising:

a connecting mount including;
  a first bar having a first end and a second end, said first end having a well extending therein, said first bar having a pair of opposed openings extending into said first bar and into said well, said openings being positioned generally adjacent to said first end of said first bar;
  a second bar being elongate and having a first and second end, said second bar being integrally attached to said second end of said first bar such that said first and second bars generally have a T-shape, said second bar having a pair of bends therein, each of said bends being generally positioned between one of the ends of said second bar and said first bar such that said ends of said second bar extend in an opposite direction of said first bar, said second bar having a pair of apertures therein, each of said apertures being generally located adjacent to one of the ends of said second bar, wherein each of said ends of said second bar are removably coupled to one of said receiving members of said plow mount;
  a pair of reinforcing bars, each of said reinforcing bars being integrally coupled to and extending between one of said bends in said second bar and said first bar;
  a pair of tabs, each of said tabs being integrally coupled to and extending upwardly from one of said reinforcing bars, each of said tabs being positioned generally adjacent to one of said bends, each of said tabs having a hole therethrough;
  a bracket being integrally coupled to a bottom side of said first bar;
  a loop member being integrally coupled to said bottom side of said first bar and positioned generally adjacent to said first end of said first bar;
a hoist mount being removably coupled to said connecting mount, said hoist mount comprising;
  a first rod being elongate and having a first end and second end, said first end of said first rod being extendable into said well, said first rod having a bore extending therethrough, said bore being alignable with said opposed openings in said first bar, a pin being extendable through said opposed openings and said bore to removably secure said first bar to said first rod;
  a second rod being elongate and having a first end and a second end, said first end of said second rod being integrally coupled to said first rod in a generally perpendicular orientation, said second rod being positioned generally between said first and second ends of said first rod, said second rod being orientated generally perpendicular to said bore extending through said first rod;
  a pair of reinforcing members, each of said reinforcing members being elongate and having a first and second end, said first ends of said reinforcing members being securably attached to said second rod and positioned generally adjacent to said second end of said second rod, each of said reinforcing members having an aperture therein positioned generally adjacent to said second ends of said reinforcing members, each of a pair of pins being extendable through one of said apertures in said reinforcing member and through one of said holes in said tabs to removably attach each of said reinforcing members to one of said tabs;
  a third rod being elongate and having a first end and a second end, said third rod being pivotally coupled to said second end of said second rod, said first end of said third rod being positioned generally adjacent to said second end of said second rod;
  a hook member being securely attached to a bottom side of said third rod, said hook member being located generally adjacent to said second end of said third rod;
  an urging means for selectively urging said second end of said third rod in a vertical motion, said urging means comprising a pump, said pump having a first end and a second end extendable away from said first end, said first end of said pump being pivotally coupled to said first rod and positioned between said second rod and said second end of said first rod, said second end of said pump being pivotally coupled to said third rod and positioned between said second rod and said second end of said third rod, said urging means comprising a pneumatic pump; and
a bracing member for bracing said connecting mount in relation to said bottom portion of said plow mount, said bracing member comprising;
  a coupling means for removably coupling to the bottom portion of the plow mount;
  a biasing means for biasing said connecting mount away from said coupling means, said biasing means extending between and being pivotally coupled to said coupling means and said bracket on said connecting mount, said biasing means comprising a pump.

10. A collapsible hoisting system, comprising:

a vehicle having a front;

a plow mount comprising:
  a bottom portion coupled to the front of said vehicle; and
  a receiving arm extending upwardly from the bottom portion, the receiving arm having a pair of spaced receiving members thereon for receiving the apparatus, the receiving arm being selectively movable in a vertical direction; and a collapsible hoisting apparatus comprising:
  a connecting mount being removably mounted on said receiving arm of said plow mount such that selective raising and lowering of the plow mount raises and lowers the connecting mount with respect to a ground surface beneath said vehicle,
  said connecting mount including:
    a first bar having a first end and a second end, said first end having a well extending therein;
    a second bar having a first and second end, said second bar being attached to said second end of said first bar such that said first and second bars generally have a T-shape, end portions of said second bar extending rearwardly with each of said ends of said second bar being removably coupled to said receiving arm of said plow mount;
  a hoist mount being removably coupled to said connecting mount, said hoist mount comprising:
    a first rod being removably coupled to said connecting mount, said first rod being extendable into said well;
    a second rod having a first end and a second end, said first end of said second rod being coupled to said first rod in a generally perpendicular orientation;
    a third rod having a first end and a second end, said third rod being pivotally coupled to said second end of said second rod; and
    an urging means for selectively pivoting said third rod with respect to said second rod to produce generally vertical motion of said second end of said third rod.

11. The collapsible hoisting apparatus as in claim 10, wherein said connecting mount further includes a pair of reinforcing bars, each of said reinforcing bars being coupled to and extending between one of said end portions of said second bar and said first bar.

12. The collapsible hoisting apparatus as in claim 11, wherein said apparatus further includes:
  a pair of tabs, each of said tabs being coupled to and extending upwardly from one of said reinforcing bars, each of said tabs being positioned generally adjacent to one of said end portions, each of said tabs having a hole therethrough; and
  a pair of reinforcing members, each of said reinforcing members being elongate and having a first and second end, said first ends of said reinforcing members being attached to said second rod and positioned generally adjacent to said second end of said second rod, each of said second ends being removably attachable to one of said tabs.

13. The collapsible hoisting apparatus as in claim 11, further comprising:
  a bracket being coupled to a bottom side of said first bar; and
  a bracing member for bracing said connecting mount in relation to said bottom portion of said plow mount, said bracing member extending between said bottom portion and said bracket on said first bar.

14. The collapsible hoisting apparatus as in claim 13, wherein said bracing member comprises:
  a coupling means for removably coupling to the bottom portion of the plow mount; and
  a biasing means for biasing said connecting mount away from said coupling means, said biasing means extending between and being pivotally coupled to said coupling means and said bracket on said connecting mount.

15. The collapsible hoisting apparatus as in claim 10, wherein said hoist mount further includes a hook member being attached to a bottom side of said third rod, said hook member being located generally adjacent to said second end of said third rod.

16. The collapsible hoisting apparatus as in claim 10, wherein said urging means comprises a pump having a first end and a second end extendable away from said first end, said first end of said pump being pivotally coupled to said first rod and positioned between said second rod and said second end of said first rod, said second end of said pump being pivotally coupled to said third rod and positioned between said second rod and said second end of said third rod, said urging means comprising a pneumatic pump.

\* \* \* \* \*